Oct. 24, 1944.　　　　A. VANG　　　　2,361,071
VIBRATION DAMPENING
Filed Sept. 23, 1942
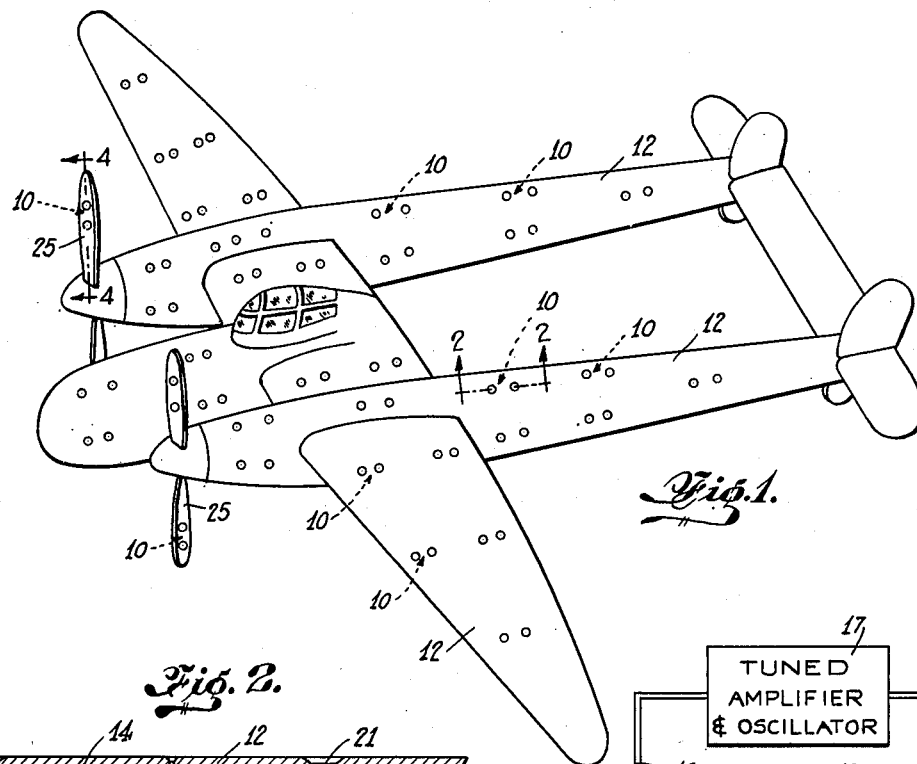
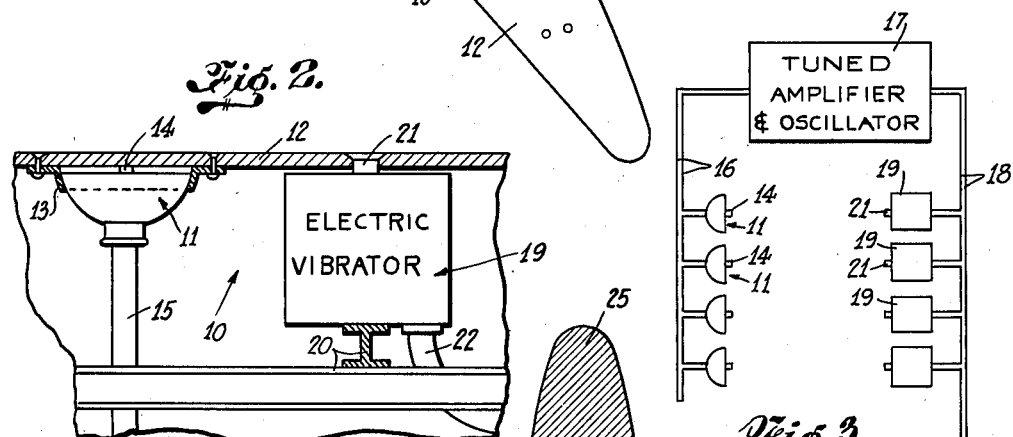
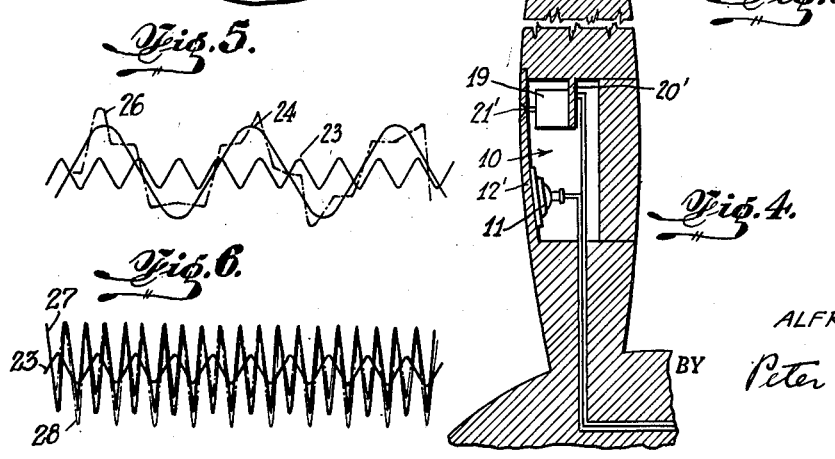
INVENTOR.
ALFRED VANG.
BY Peter M. Boesen
ATTORNEY.

Patented Oct. 24, 1944

2,361,071

UNITED STATES PATENT OFFICE 2,361,071

VIBRATION DAMPENING

Alfred Vang, Newark, N. J., assignor of one-half to Stevenson, Jordan & Harrison, Inc., New York, N. Y., a corporation of New York Application September 23, 1942, Serial No. 459,388

12 Claims. (Cl. 188—1)

This invention relates to new and useful improvements in vibration dampening, and has more particular reference to a method and means for the dampening of vibrations in airplane skins and other parts and devices.

The destructive qualities of vibrations in devices and structures are generally known, and in many fields, science has progressed to materially reduce and avoid the presence of critical vibrations. However, in other fields there has been little or no progress in vibration reduction or elimination. For example, in machine design great strides have been made in the elimination of vibration. Usually high speed shafts are so designed that they do not rotate at critical speeds, which would produce critical vibrations. This progress was made of necessity since it was found that shafts rotating at critical speeds develop critical vibrations and crystallize and then break. In machine design numerous other steps are used to reduce or avoid critical vibrations. In bridge design great progress has been made in this direction, also because of necessity. It was found that bridges which had a natural vibration within the range of its critical vibration were poor designs and would collapse irrespective of the fact that the parts theoretically could easily support their loads.

There are numerous examples of fields in which the reduction or elimination of vibration has lagged. One such field is in the design of automobile bodies. There are many automobiles in which vibrations wreck the body long before the motor wears out. Airplane bodies are also in the category of those fields lagging in vibration studies. This is particularly true of the skins of the airplane bodies.

Generally an airplane is considered old when its body becomes loose and defective due to a great extent to vibration. Yet, very little has been done in trying to eliminate such vibration. This invention proposes the dampening of the vibrations in the skins of airplanes, primarily for the purpose of lengthening their lives. The invention is useful in peacetime, though it has valuable applications in war time also. Planes in battle which suffer shots are particularly subject to destructive skin vibrations. Portions of the skin become loose and start vibrating, and unless these vibrations are held outside of the critical range, the damage will quickly spread and the plane will disintegrate. If these vibrations could be dampened or controlled, it is believed that many planes which heretofore could not reach their bases would be able to get back.

There are numerous types of destructive critical vibrations, but the two most common are those vibrations which crystallize the vibrating material, and those which injure the material by causing permanent deformation by exceeding the yield point or the elastic limit. Those vibrations causing crystallization act upon the material's molecular construction. Those vibrations which cause permanent deformation are in the nature of the harmonic tune type in which each impulse is synchronized with prior impulses, building up the waves of vibration until the amplitude causes the damage. Sometimes both these kinds of vibration operate simultaneously. It is known that the ultimate strengths of many metals are from one-half to one-third lower during vibration near their critical range.

There is a basic method, in accordance with this invention, for dampening and controlling the vibrations, which basic method may be carried out in more than one way, and for this reason several modifications will be described in this specification. The basic method consists in detecting vibrations in the skins or other parts, which vibrations are in a critical destructive range with a displacement type of pick up, and then dampening or controlling said critical vibrations with power transmitted by supersonic waves controlled by said pick up to function in proportion to, or in relation with the strength of the original vibrations. It is proposed to so utilize the supersonic waves that they function to produce a resultant vibration which is out of the critical range. This resultant vibration may be more than, or less than the critical range. It is proposed to so utilize the supersonic waves that a state of equilibrium with the original critical vibrations is struck. When this state is reached the resultant vibrations are relatively harmless.

In accordance with this invention the supersonic waves may be controlled with an electric oscillator or with a quartz crystal oscillator. In either case it is proposed that the displacement type of pick up translate the vibrations in the skins or other parts which are in a critical destructive range to electrical impulses. It is proposed that these electrical impulses be amplified with a tuned electrical amplifier and then be converted into a slow beat or high beat frequency with some kind of oscillator. The original critical vibrations are then dampened by electrical vibrators controlled by said slow or high beat frequency so as to obtain a resultant vibration which is out of the range of the critical destructive vibration.

It is believed that the value of this invention may readily be checked with an oscilloscope. Oscillograms may be produced of the original critical vibration, and then this invention may be applied and oscillograms made of the new resultant vibration. Tests may then be carried out to determine the critical range, and then it is easily seen whether or not the resultant vibrations lay safely outside the range. It would also be instructive to actually view the vibrations with a stroboscope during these studies.

The invention also contemplates a construction of simple means for carrying out the broad concepts thereof. In order to practice the invention it is proposed that a plurality of units be provided, which should be mounted at spaced positions upon the material which is to be controlled. It is proposed that these units be mounted internally on the airplane skin; that is, within the wings and within the fuselage. Each unit may include a displacement type of pick up and an electric vibrator. These units may be connected in series with a master tuned amplifier and oscillator, or they may be connected in groups and several tuned amplifiers and oscillators may be used. With this system of practising the invention we will pick up an average of the various critical vibrations in the skin or other part, and we will deliver an average or mean resultant vibration. However, in order for the invention to work successfully this resultant vibration must be out of the critical range.

With the above and other objects in view, this invention consists of the novel features of construction, combination and arrangement of parts, hereinafter fully described, claimed, and illustrated in the accompanying drawing, forming part of this application, and in which similar characters of reference indicate corresponding parts in all views, and in which:

Figure 1 is a perspective view of an airplane provided with means for dampening vibrations in the skin and other parts, constructed in accordance with this invention.

Figure 2 is a fragmentary vertical sectional view taken on the line 2—2 of Figure 1.

Figure 3 is a schematic wiring diagram of the device.

Figure 4 is a fragmentary vertical sectional view taken on the line 4—4 of Figure 1.

Figure 5 is a schematic view of theoretical vibrations in accordance with this invention.

Figure 6 is another schematic view of the theoretical vibrations in accordance with this invention.

The means for vibration dampening in the airplane skins or other parts and devices, in accordance with this invention, includes a plurality of units 10 mounted at spaced positions upon the skin or other parts of the airplane. These units preferably are mounted on the inner face of the skin or other parts. Each unit consists of a displacement type of pick up 11 for translating vibrations in the skin 12 or other parts or devices into electrical impulses. The pick up 11 is of the general type used in oscilloscopes. It is held in position by several brackets 13. Its vibratory rod 14 is held in intimate contact with the skin 12. The pick up 11 is connected by a cable 15 in an electric circuit 16 which connects the various pick ups of the various units 10, in series, with a tunable amplifier 17. This amplifier is provided with an oscillator discharging into the circuit 16. The circuit 16 is provided with a plurality of electric vibrators 19 connected in series. Each unit 10 includes one of these vibrators 19.

Each vibrator 19 has its body supported on a frame 20 mounted within the wing, fuselage or other part beneath the skin 12. The core 21 of the electric vibrator 19 is connected with the skin 12. Each vibrator 19 has a cable 22, which is connected with the circuit 16.

The operation of the device is as follows:

The pick up 11 translates vibrations within the skin 12 or other part into electrical impulses which pass through the circuit 16 and which are amplified by the tuned amplifier 17. This amplifier is tuned so as to be sensitive only to those vibrations within the critical destructive range of vibration of the skin 12 or other part or device. The tuned amplifier 17 is also provided with an oscillator which converts the amplified impulses into a slow beat or high beat frequency electric wave, depending upon whether the device is designed to operate above or below the range of critical destructive vibrations.

The impulses in the circuit 16 operate the electromagnets 19, which in turn transmit a vibration to the skin 12. The two vibrations described are schematically illustrated in Figure 5. In this figure the wave 23 schematically indicates the original critical range destructive vibration. The wave 24 schematically indicates a slow beat frequency vibration superimposed upon the higher frequency vibration 23. This slow beat vibration 24 is of an intensity controlled by the intensity of the original vibration or signal. These vibrations merge to produce a resultant vibration illustrated by the dot and dash line 26 but which must be outside of the range of the critical vibration of the skin 12 or other part or device. This schematic view only shows one example of the present invention. Figure 6 shows another case in which a high beat frequency vibration 27 is brought back to dampen the original critical vibration 23 to produce a resultant vibration 28 out of the critical range.

In Figures 1 and 4 the present invention is also shown applied to the propellers 25 of the airplane. Each blade is provided with one or more units 10. These units 10 are of identical construction to the units 10 previously described. Briefly, the unit includes the displacement type of pick up 11 mounted upon the skin 12' of the propeller blade and indirectly controlling the vibrations of the electric vibrator 19, which is supported on a supporting structure 20' and which has its core 21' connected with the skin 12'.

In other respects the operation of the invention is identical to the previous form.

It is obvious that changes may be made in the form, construction, and arrangement of the several parts, as shown, within the scope of the appended claims, without departing from the spirit of the invention, and I do not, therefore, wish to limit myself to the exact construction shown and described herein.

Having thus described my invention, what I claim as new and desire to secure by United States Letters Patent is:

1. A method of vibration control for airplane skins and other parts and devices, consisting in detecting vibrations in said skins or other parts, which are in a critical destructive range with a displacement type of pick up, and overpowering said critical vibrations with power transmitted by supersonic waves out of the critical range controlled by said pick up to function in proportion to or in relation with the strength of said original vibrations.

2. A method of vibration control for airplane skins and other parts and devices, consisting in detecting vibrations in said skins or other parts, which are in a critical destructive range with a displacement type of pick up, and overpowering said critical vibrations with power transmitted by supersonic waves out of the critical range controlled by said pick-up to function in proportion to or in relation with the strength of said original vibrations, and functioning to produce a resultant vibration which is out of the critical range.

3. A method of vibration control for airplane skins and other parts and devices, consisting in detecting vibrations in said skins or other parts, which are in a critical destructive range with a displacement type of pick up, and overpowering said critical vibrations with power transmitted by supersonic waves out of the critical range controlled by said pick-up to function in proportion to or in relation with the strength of said original vibrations, and functioning to produce a resultant vibration which is out of the critical range, and in a state of equilibrium with the original critical vibrations.

4. A method of vibration control for airplane skins and other parts and devices, consisting in detecting vibrations in said skins or other parts, which are in a critical destructive range with a displacement type of pick up, and overpowering said critical vibrations with power transmitted by supersonic waves out of the critical range controlled by said pick-up to function in proportion to or in relation with the strength of said original vibrations, and functioning to produce a resultant vibration which is out of the critical range, and in a state of equilibrium with the original critical vibrations; said supersonic waves being controlled with an electric oscillator.

5. A method of vibration control for airplane skins and other parts and devices, consisting in translating vibrations in said skin or other parts, which are in a critical destructive range into electrical impulses with a displacement type of pick-up, amplifying these electrical impulses with a tuned electrical amplifier, converting these amplified impulses into a slow beat frequency with an oscillator, and overpowering the original critical vibrations with electric vibrators operated by said slow beat frequency for obtaining a resultant vibration which is out of the critical destructive vibration range.

6. A method of vibration control for airplane skins and other parts and devices, consisting in mounting a plurality of displacement type of pick-ups at spaced points on said skin or other part, translating vibrations in said skin or other part which are in a critical destructive range to electrical impulses, amplifying these impulses with a tuned electrical amplifier, converting these amplified impulses into a desirable beat frequency wave with an oscillator and overpowering the original critical vibrations with electric vibrators adjacent said pick-ups, operated by said beat frequency waves for obtaining a resultant vibration, which is out of range of the critical destructive vibrations of said skin or other part.

7. A method of vibration control for airplane skins and other parts and devices, consisting in translating vibrations in said skin or other parts, which are in the critical destructive range into electrical impulses with a displacement type of pick-up, amplifying these electrical impulses with a tuned electrical amplifier, converting these amplified impulses into a high beat frequency electric wave with an oscillator, and overpowering the original critical vibrations with electric vibrations operated by said high beat frequency electric wave for obtaining a resultant vibration, which is out of the critical destructive vibration range.

8. Vibration controlling means for airplane skins and other parts and devices, comprising means for detecting vibrations in said skins or other parts, which are in a critical destructive range, and means for overpowering said critical vibrations with power transmitted by supersonic waves in proportion to or in relation with the strength of the original vibrations.

9. Vibration controlling means for airplane skins and other parts and devices, comprising means for detecting vibrations in said skins or other parts, which are in a critical destructive range, and means for overpowering said critical vibrations with power transmitted by supersonic waves in proportion to or in relation with the strength of the original vibrations; said detecting means including a displacement type of pick-up.

10. Vibration controlling means for airplane skins and other parts and devices, comprising means for detecting vibrations in said skins or other parts, which are in a critical destructive range, and means for overpowering said critical vibrations with power transmitted by supersonic waves in proportion to or in relation with the strength of the original vibrations; said detecting means including a displacement type of pick-up, and said overpowering means including an electro-magnet.

11. Vibration controlling means for airplane skins and other parts and devices, comprising a plurality of units mounted on said skins and each consisting of a displacement type of pick-up and an electric amplifier, said pick-ups being adapted to translate vibrations in said skins or other parts, which are in the critical destructive range into electrical impulses, means for amplifying these electrical impulses, means for converting these amplified impulses into a desirable beat frequency electric wave, and means for overpowering the original critical vibrations operated by said beat frequency electric wave for obtaining a resultant vibration, which is out of the range of the destructive critical vibration.

12. Vibration controlling means for airplane skins and other parts and devices, comprising a plurality of units mounted on said skins and each consisting of a displacement type of pick-up and an electric amplifier, said pick-ups being adapted to translate vibrations in said skins or other parts, which are in the critical destructive range into electrical impulses, means for amplifying these electrical impulses, means for converting these amplified impulses into a desirable beat frequency electric wave and means for overpowering the original critical vibrations operated by said beat frequency electric wave for obtaining a resultant vibration, which is out of the range of the destructive critical vibration; said pick-ups of the various units being connected in series.

ALFRED VANG.